(12) United States Patent
Orikasa

(10) Patent No.: US 8,355,184 B2
(45) Date of Patent: Jan. 15, 2013

(54) IMAGE READING DEVICE, IMAGE FORMING DEVICE, AND IMAGE READING METHOD

(75) Inventor: Noriaki Orikasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1017 days.

(21) Appl. No.: 12/365,285

(22) Filed: Feb. 4, 2009

(65) Prior Publication Data

US 2009/0219581 A1 Sep. 3, 2009

(30) Foreign Application Priority Data

Feb. 14, 2008 (JP) ................................. 2008-033453
Dec. 15, 2008 (JP) ................................. 2008-318867

(51) Int. Cl.
*H04N 1/04* (2006.01)

(52) U.S. Cl. .................. 358/475; 358/474; 358/497

(58) Field of Classification Search .............. 358/482, 358/483, 484, 474, 406, 509, 512–514, 505, 358/475, 497; 250/234–236
See application file for complete search history.

(56) References Cited

U.S. PATENT DOCUMENTS

| 5,902,993 | A * | 5/1999 | Okushiba et al. | 250/208.1 |
| 6,552,829 | B1 * | 4/2003 | Maciey et al. | 358/509 |
| 8,056,807 | B2 * | 11/2011 | Lo et al. | 235/454 |
| 2002/0186427 | A1 | 12/2002 | Orikasa | |
| 2005/0248959 | A1 * | 11/2005 | Chiou | 362/602 |
| 2008/0231916 | A1 | 9/2008 | Inadome et al. | |

FOREIGN PATENT DOCUMENTS

| JP | 61-142857 A | 6/1986 |
| JP | 02-237361 A | 9/1990 |
| JP | 2002-314760 | 10/2002 |
| JP | 2005-051381 A | 2/2005 |
| JP | 2006-245955 | 9/2006 |
| JP | 2007-180774 A | 7/2007 |

OTHER PUBLICATIONS

Japanese Office Action dated Jul. 10, 2012.

* cited by examiner

*Primary Examiner* — Cheukfan Lee
(74) *Attorney, Agent, or Firm* — IPUSA, PLLC

(57) ABSTRACT

An image reading device includes a light source part in which plural point light sources are arrayed in parallel to a main scanning direction, a line sensor part in which plural light quantity sensors are arrayed in parallel to the main scanning direction, a reduction optical system containing a lens and focusing a reflected light beam indicating image information of a document irradiated by a light beam from the light source part, on the line sensor part to read the image information, and a control part configured to control a quantity of irradiating light of each point light source of the light source part in accordance with an optical characteristic of the lens of the reduction optical system.

14 Claims, 12 Drawing Sheets

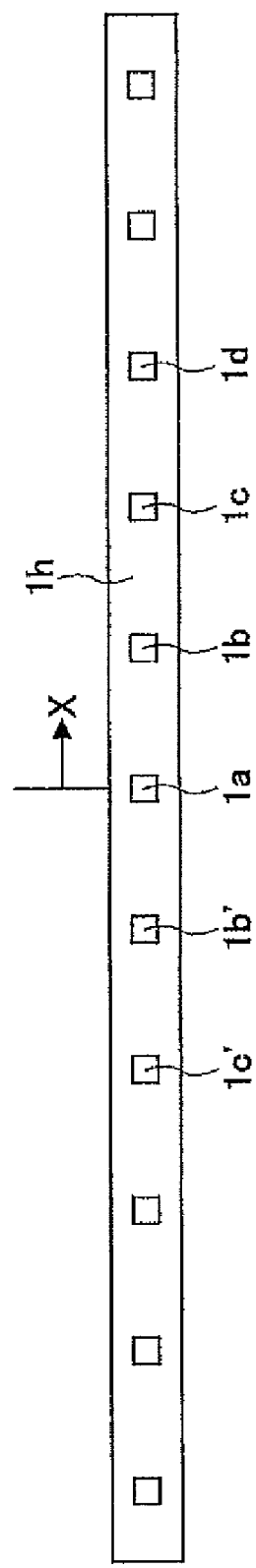

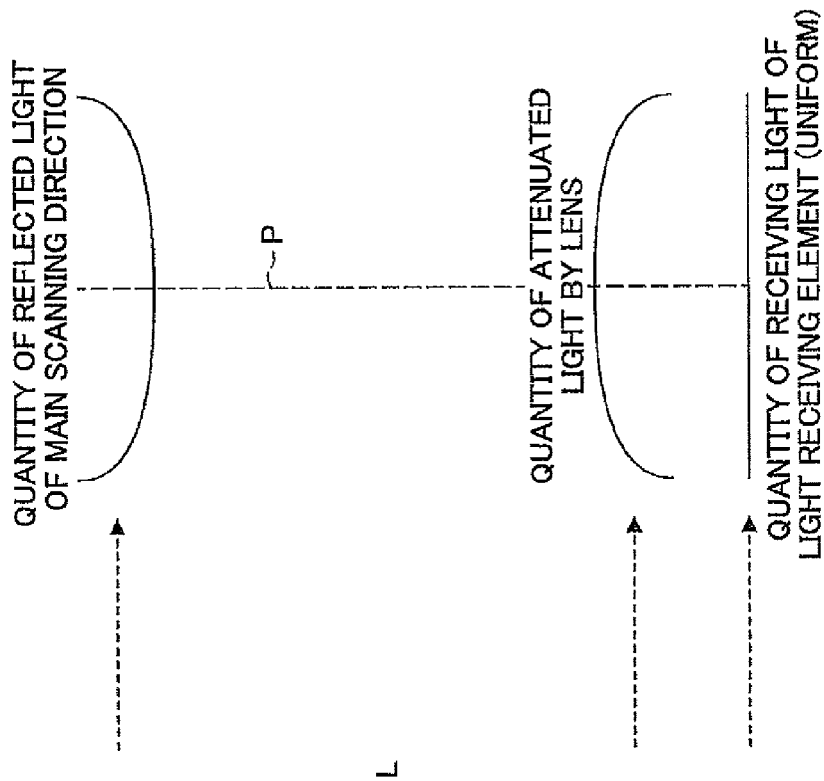
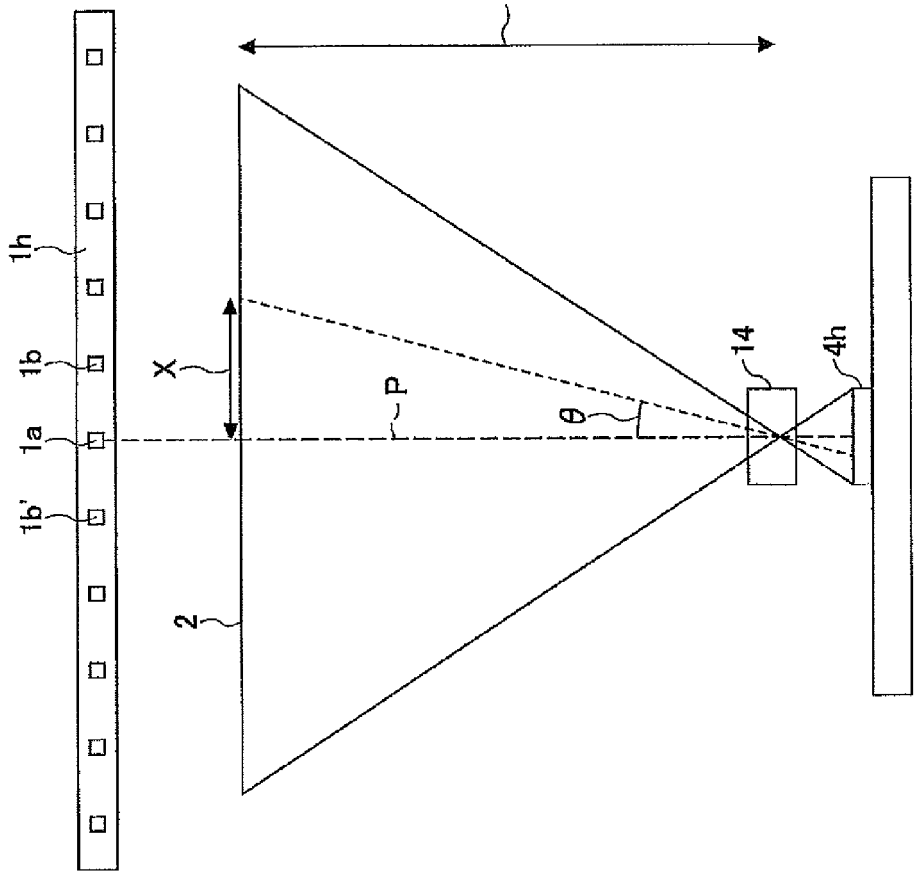

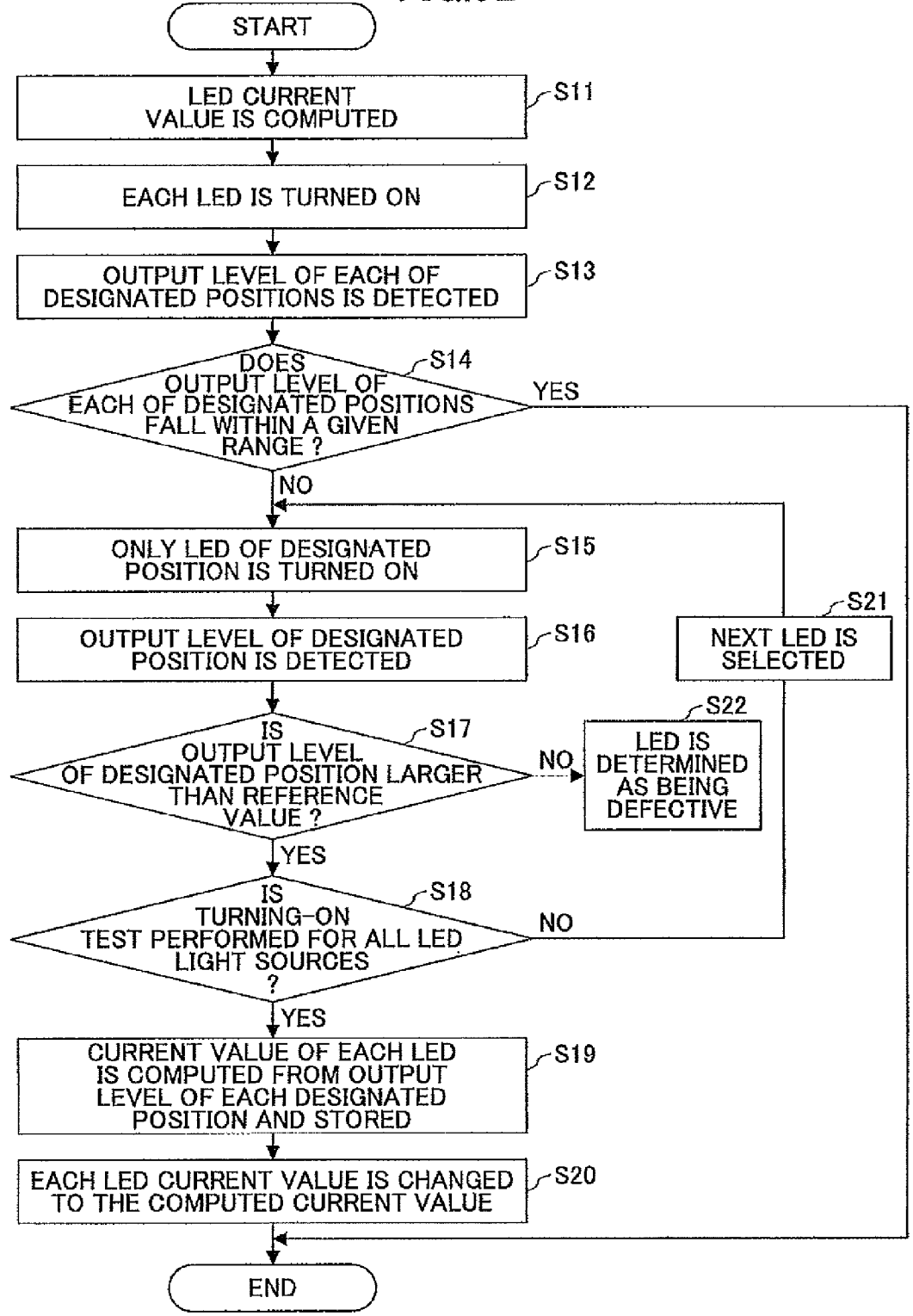

IMAGE READING DEVICE, IMAGE FORMING DEVICE, AND IMAGE READING METHOD

BACKGROUND OF THE INVENTION

1. Field of the Invention

This invention relates to an image reading device, an image forming device, and an image reading method.

2. Description of the Related Art

FIG. 10 shows a reading optical system in an image reading device according to the related art.

The image reading device reads an image from a document by using the reading optical system.

In the reading optical system of FIG. 10, an image portion 2a of a document 2 placed on a contact glass 3 (which is a document base) is located near an optical-axis P of the reading optical system, and the image portion 2a is irradiated by a light beam from a light source 1z. A reflected light beam indicating the image portion 2a is led to a lens 14 via reflectors 15a, 15b and 15c, and the reflected light beam is focused on a light quantity sensor 4 through the lens 14. The light quantity sensor 4 is a solid-state image pickup device which is called a light receiving element, a CCD (charge-coupled device), a CCD element or an image sensor. A reflector 13 is disposed to effectively irradiate the document 2 by the light beam from the light source 1z.

The image reading device is usually arranged so that a plane image (in two dimensions) of a document is read rather than reading a point image of a document. The image reading device is arranged to read image information from a document in the horizontal direction in FIG. 10. This direction is called the sub-scanning direction.

One method of reading the image in the sub-scanning direction is to read image information from the image portion 2a of the document 2 using the light quantity sensor 4, by moving the document 2 on the contact glass 3 in the sub-scanning direction, so that the image information is read serially in the sub-scanning direction. This method is called the image reading by automatic document feeding.

Another method of reading the image in the sub-scanning direction is to read image information from the image portion 2a of the document 2 using the light quantity sensor 4 in the sub-scanning direction, while the document 2 on the contact glass 3 is fixed. In this image reading method, the document 2 is fixed relative to the lens 14 and the light quantity sensor 4, and the module including the light source 1z, the reflector 15a and the reflector 13 is moved in the sub-scanning direction (or, in the direction from the left to the right in FIG. 10). The position of the document 2 which is irradiated by the light source 1z is moved in the direction from the left to the right in FIG. 10. Simultaneously, the optical axis P between the reflector 15a and the document 2 is moved in the direction from the left to the right in FIG. 10, and the intersection 2a of the document 2 and the optical axis P is always an image reading position of the light quantity sensor 4. In this way, even when the document is moved, the image information can be read from the document in the sub-scanning direction.

By moving the reflectors 15b and 15c in parallel with the reflector 15a at the speed equal to one half of the moving speed of the reflector 15a, the distance of the optical path from the document 2 to the lens 14 can be maintained at a constant value.

Thus, the ratio of the quantity of receiving light on the surface of the lens 14 to the quantity of irradiating light on the document 2 can be maintained at a constant value.

Next, a method of reading the image from the document in a main scanning direction will be described. The main scanning direction is the direction perpendicular to the drawing of FIG. 10, and this main scanning direction is perpendicular to the sub-scanning direction in which the light source and the reflector are moved relative to the document.

FIG. 11A shows the composition of a reduction optical system in the reading optical system of FIG. 10 which is viewed from the side of the sub-scanning direction.

For the sake of convenience, the illustration of the reduction optical system in FIG. 11A is modified as follow, the reflectors 15a, 15b and 15c are omitted and the position of the light source 1z is shifted to the position over the document 2, in order to express the actual distance of the optical path from the document 2 to the lens 14 in the reading optical system along the optical axis. Apparently, the distance of the optical path in FIG. 10 is enlarged in the vertical direction in FIG. 11A.

In the reading optical system shown in FIG. 11A, the image of the document 2 spreading in the main scanning direction is reduced by the lens 14, and the reflected light beams from the document 2 are focused on the line sensor part 4h by the lens 14. In the line sensor part 4h, plural light quantity sensors 4 are arrayed in parallel to the main scanning direction. The image information is read from the respective light beams focused on the line sensor part 4h by the respective light quantity sensors 4. For this reason, this reading optical system is called a reduction optical system. In the image reading device, the plane (two dimensions) image is read from the document in both the main scanning direction and the sub-scanning direction.

Theoretically, the image information in the main scanning direction can be read by the light quantity sensors without time lag. However, a certain time is needed to convert the read information into digital data, process the data and store the processed data. For this reason, in many cases, the two-dimensional image information is read serially by the image reading device, so that the process of reading easily accords with the data processing including the converting, the processing and the storing.

Examples of the light source used for irradiating a document may include rod-like lamp light sources, such as a xenon lamp, a cold cathode tube, and a halogen lamp. In many cases, the light source of this type is arranged to irradiate the whole length of the main scanning direction at a time. It is impossible to adjust partially the quantity of light in the light source of this type.

When the rod-like lamp light source is used, the quantities of the reflected light beams focused on the light receiving elements of the line sensor part may not be uniform in the main scanning direction. To avoid the problem, it is necessary to adjust the quantities of irradiating light by interrupting partially the irradiating light beams mechanically (mechanical shading), in order to obtain the required quantities of the irradiating light beams.

In recent years, a line-type LED light source in which plural LEDs (light emitting diodes) with high intensity are arrayed in parallel is adopted increasingly, rather than the rod-like lamp light source mentioned above.

In the case of the line-type LED light source, the light quantity of each LED is controllable, the light quantities of the respective LEDs in the longitudinal direction of the light source can be partially adjusted, and effective use of irradiating light is also possible.

Japanese Laid-Open Patent Application No. 2002-314760 discloses an image reading device including a reading optical system formed of a plurality of LEDs (light emitting diodes), in order to eliminate the nonuniformity of the irradiating light quantity and improve the quality of a reproduced image by reducing partially black image portions (shadow).

Japanese Laid-Open Patent Application No. 2006-245955 discloses a method of equalizing the distribution of the quantities of irradiating light to a document by using a reflector of a reading optical system in order to improve the ripples (uneven quantities of irradiating light) of the irradiating light to the document surface.

In the reduction optical system of the image reading device according to the related art, the angle of spreading of the irradiating light beams to the document 2 in the main scanning direction is comparatively large, and the angle of spreading of the reflected light beams incident to the lens 14 is also comparatively large. Generally, the lens 14 has the optical characteristic such that, when the angle between the optical axis and a light beam entering the lens 14 is comparatively large, the quantity of a transmitted light beam after passing the lens 14 is attenuated from the quantity of the light beam before entering the lens 14.

FIG. 11B is a diagram for explaining the optical characteristic of the lens 14. In the case of FIG. 11B, it is assumed that a document 2 having a uniform optical characteristic, such as a white reference plate, is irradiated by a uniform-quantity light from the light source, and a reduction optical system containing the lens 14 is used to focus a reflected light beam from the document 2 on the line sensor part 4h. FIG. 11B shows the quantities of the attenuated light beams by the lens 14 and the quantities of the receiving light beams on the respective light quantity sensors of the line sensor part 4h.

As is evident from FIG. 11B, even when the quantity of light of the document 2 is irradiated by a uniform-quantity light from the light source, the quantities of the receiving light on the line sensor part 4h at end positions apart from the optical axis P are significantly reduced according to the light quantity attenuation characteristic of the lens 14.

In other words, the lens 14 in the reduction optical system has the optical characteristic such that, when the light reflected from the document 2 enters the lens 14 at an end position apart from the optical axis P, the quantity of transmitted light from the lens 14 is easily attenuated.

If a shading correction is performed on the output of each light quantity sensor 4 in the line sensor part 4h, the quantity of the receiving light can be corrected by electrically amplifying the output of each light quantity sensor 4 in a controlled manner. However, if a certain noise occurs before the photoelectric conversion of the output of each light quantity sensor 4 or the correction by the amplification of the output of each light quantity sensor 4, the S/N (signal/noise) ratio is increased after the photoelectric conversion or the correction, and the influence of the noise is enlarged.

Even if the read image information in this case shows a good quality (with a small S/N ratio) at the central portion of the document, the read image information shows a poor quality (with a large S/N ratio) at the end portions of the document which are apart from the optical axis. The quality of a reproduced image as a whole image becomes poor.

Conventionally, in order to reduce the variations of the image quality due to a lowering of the S/N ratio of the document end portions and to equalize of the receiving light quantities of the central portion and the end portions, a mechanical shading unit which partially shades a central light beam is used. However, even if the mechanical shading unit is used, it is difficult for the image reading device according to the related art to use the irradiating light of the light source effectively and equalize the receiving light quantity of the receiving light sensor over the whole light receiving surface.

SUMMARY OF THE INVENTION

In one aspect of the invention, the present disclosure provides an improved image reading device and method in which the above-described problems are eliminated.

In one aspect of the invention, the present disclosure provides an image reading device which is capable of using the irradiating light of the light source effectively and equalizing the receiving light quantity of the receiving light sensor over the whole light receiving surface.

In an embodiment of the invention which solves or reduces one or more of the above-mentioned problems, the present disclosure provides an image reading device which reads an image from a document, the image reading device comprising: a light source part in which plural point light sources are arrayed in parallel to a main scanning direction; a line sensor part in which plural light quantity sensors are arrayed in parallel to the main scanning direction; a reduction optical system containing a lens and focusing a reflected light beam, indicating image information of a document irradiated by a light beam from the light source part, on the line sensor part to read the image information; and a control part configured to control a quantity of irradiating light of each point light source of the light source part in accordance with an optical characteristic of the lens of the reduction optical system.

BRIEF DESCRIPTION OF THE DRAWINGS

FIG. 5 is a diagram showing the composition of a line light source unit using plural point light sources.

FIG. 6A and FIG. 6B are diagrams for explaining the irradiating light quantity adjustment of the image reading device of an embodiment of the invention.

FIG. 9A and FIG. 9B are flowcharts for explaining the process of irradiating light quantity adjustment of LED light sources.

DETAILED DESCRIPTION OF THE PREFERRED EMBODIMENTS

An image reading device of an embodiment of the invention includes a light source part in which plural point light sources are arrayed in parallel to a main scanning direction, a line sensor part in which plural light quantity sensors are arrayed in parallel to the main scanning direction, a reduction optical system containing a lens and focusing a reflected light beam indicating image information of a document irradiated by a light beam from the light source part, on the line sensor part to read the image information, and a control part configured to control a quantity of irradiating light of each point light source of the light source part in accordance with an optical characteristic of the lens of the reduction optical system.

According to the image reading device of the embodiment of the invention, it is possible to use the irradiating light of the light source effectively and equalize the receiving light quantity of the receiving light sensor over the whole light receiving surface.

Other objects, features and advantages of the present invention will become more apparent from the following detailed description when read in conjunction with the accompanying drawings.

A description will be given of embodiments of the invention with reference to the accompanying drawings.

Figure 1:
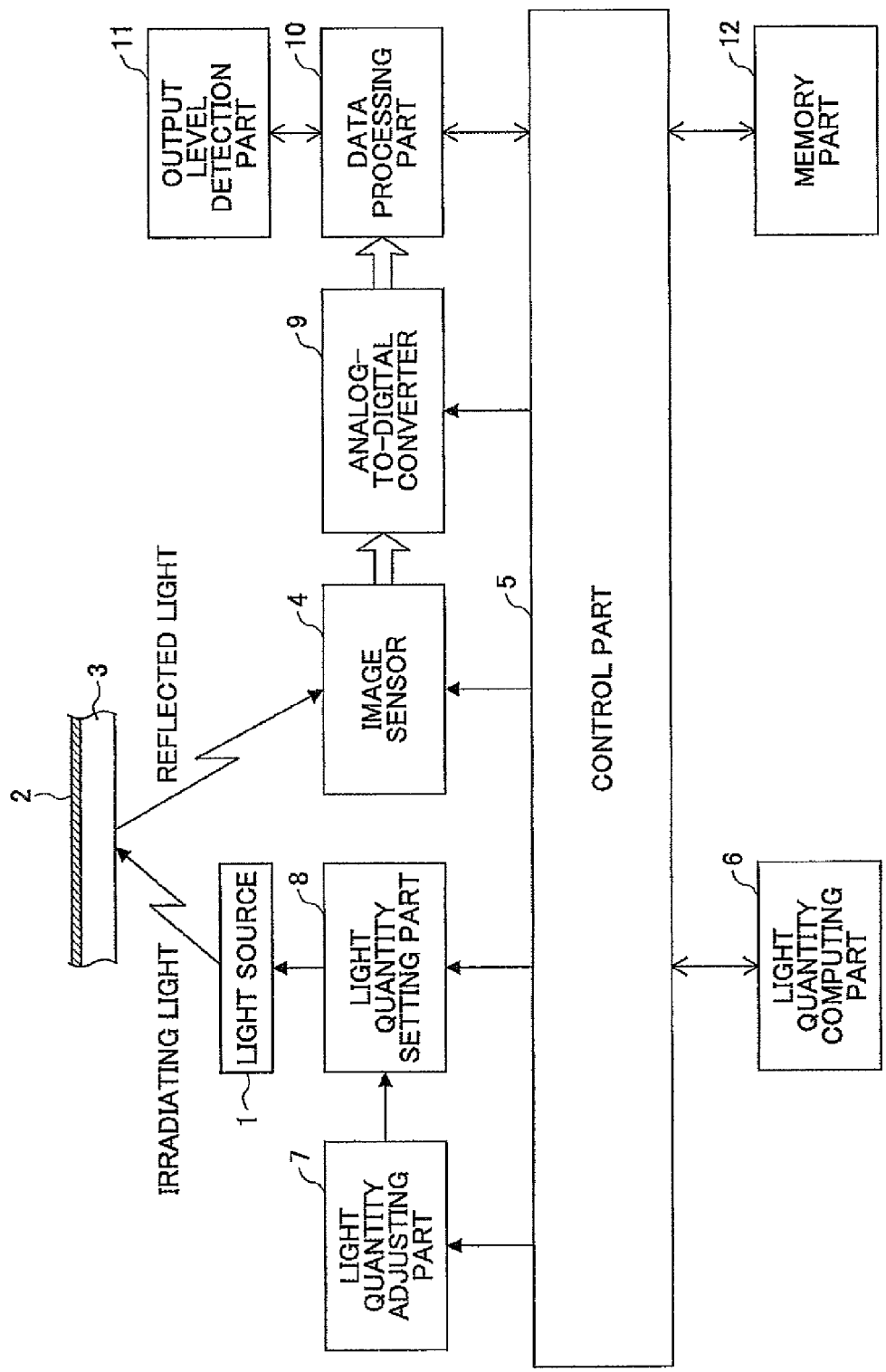
FIG. 1 is a block diagram showing the functional composition of an image reading device of an embodiment of the invention.

FIG. 1 shows the functional composition of an image reading device of an embodiment of the invention.

In the image reading device of FIG. 1, a light source 1 is formed of an array of LEDs (light emitting diodes) and the array of LEDs has a length in the main scanning direction for irradiating an entire document 2 simultaneously. A quantity of irradiating light emitted by each of the LEDs in the light source 1 is adjusted by a light quantity adjusting part 7 and a light quantity setting part 8 based on a quantity of light computed by a light quantity computing part 6. The light quantity computing part 6, the light quantity adjusting part 7, and the light quantity setting part 8 constitute an irradiating light quantity control part as a whole.

A light beam emitted from the light source 1 irradiates the document 2 on a contact glass 3, and a light beam reflected from the document 2 and indicative of image information of the document 2 is received by an image sensor 4 (which is formed of an array of light quantity sensors) through a reduction optical system containing a lens (which will be mentioned later).

In the image reading device of FIG. 1, photoelectric conversion of the receiving light obtained by the image sensor 4 is performed, and the output signal of the photoelectric conversion is converted into a digital signal by an analog-to-digital converter 9. The image correction processing of the digital signal output by the analog-to-digital converter 9 is performed by a data processing part 10. The image data output by the data processing part 10 is stored in a memory part 12.

An output level detection part 11 detects the output level at the time of reading a white reference plate which is considered as a reference document having a constant reflection factor to the irradiating light. A control part 5 controls the respective parts of the image reading device so that the image reading device operates as a whole.

Next, a reading optical system in the image reading device of an embodiment of the invention will be described.

Figure 2:
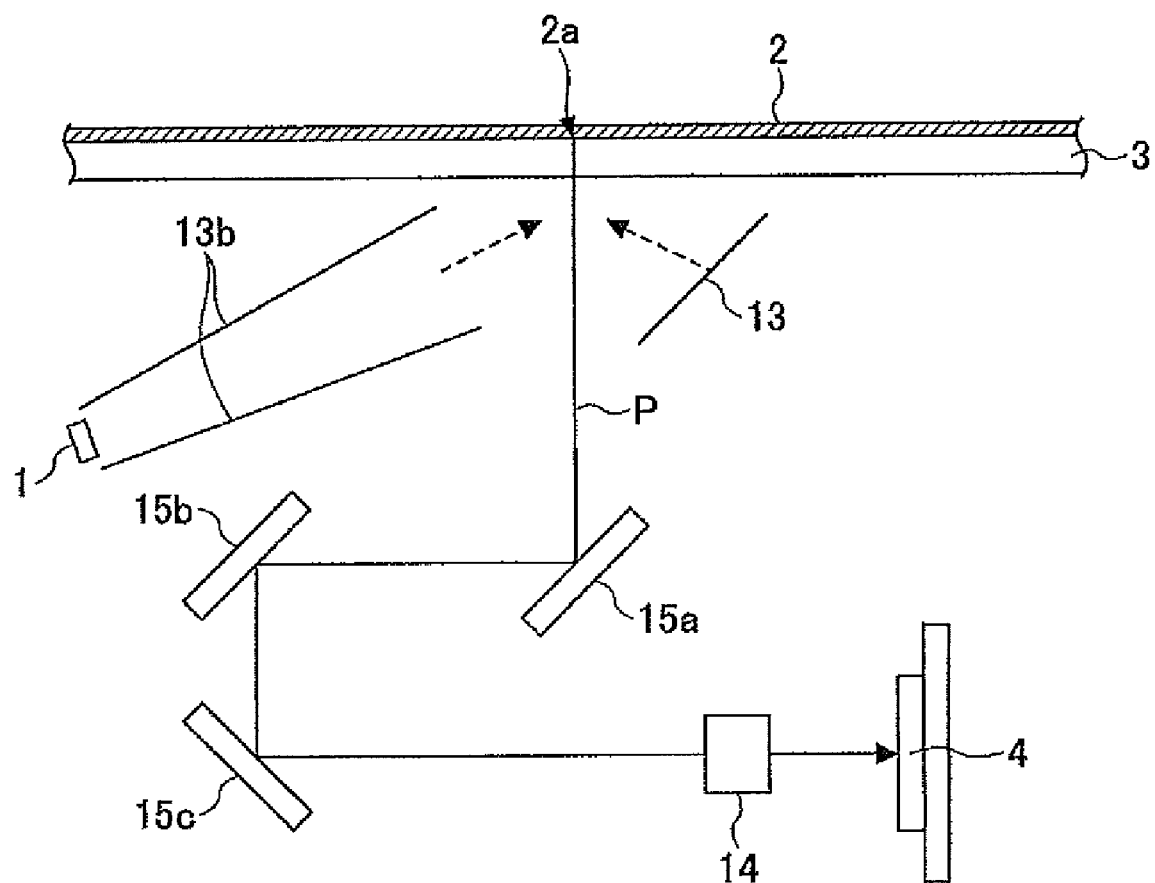
FIG. 2 is a diagram showing the composition of a reading optical system in an image reading device of an embodiment of the invention.

FIG. 2 shows the composition of a reading optical system in the image reading device of this embodiment when viewed from the side of the main scanning direction.

In the reading optical system of FIG. 2, a light source part of this embodiment includes a light source 1, a reflector 13 and a set of reflectors 13b. The light source 1 is a point light source, such as an LED. The reflector 13 is disposed apart from the light source 1 to increase the irradiation efficiency of the light source 1. The reflectors 13b are disposed near the light source 1 to increase both the irradiation efficiency and the directivity of the light source 1. As shown in FIG. 2, the light beam from the point light source 1 irradiates an image portion 2a on the document 2 (or, the intersecting point between the document 2 and the optical axis position of the reduction optical system is irradiated).

A reflected light beam from the point 2a on the document 2 indicates the image information of the document 2 and the reflected light beam reaches a lens 14 via reflectors 15a/15b and 15c. Through the lens 14, the reflected light beam is condensed or focused on a light quantity sensor 4.

In the example shown in FIG. 2, the light source 1, the reflectors 13 and 13b, and the reflector 15a are integrally supported on a mounting member, and these parts are movable together with the mounting member in the horizontal direction of FIG. 2. When the position of the document 2 irradiated by the light source 1 is moved in the direction from the left to the right in FIG. 2, the reflected light beam indicating the image information is simultaneously sent to the light quantity sensor 4 so that the image reading device can read the entire image of the document in the horizontal direction of FIG. 2. At this time, the reflectors 15b and 15c are moved in parallel with the reflector 15a at the speed equal to one half of the moving speed of the reflector 15a, so that the distance of the optical path from the document 2 to the lens 14 can be maintained at a constant value.

Figure 3:
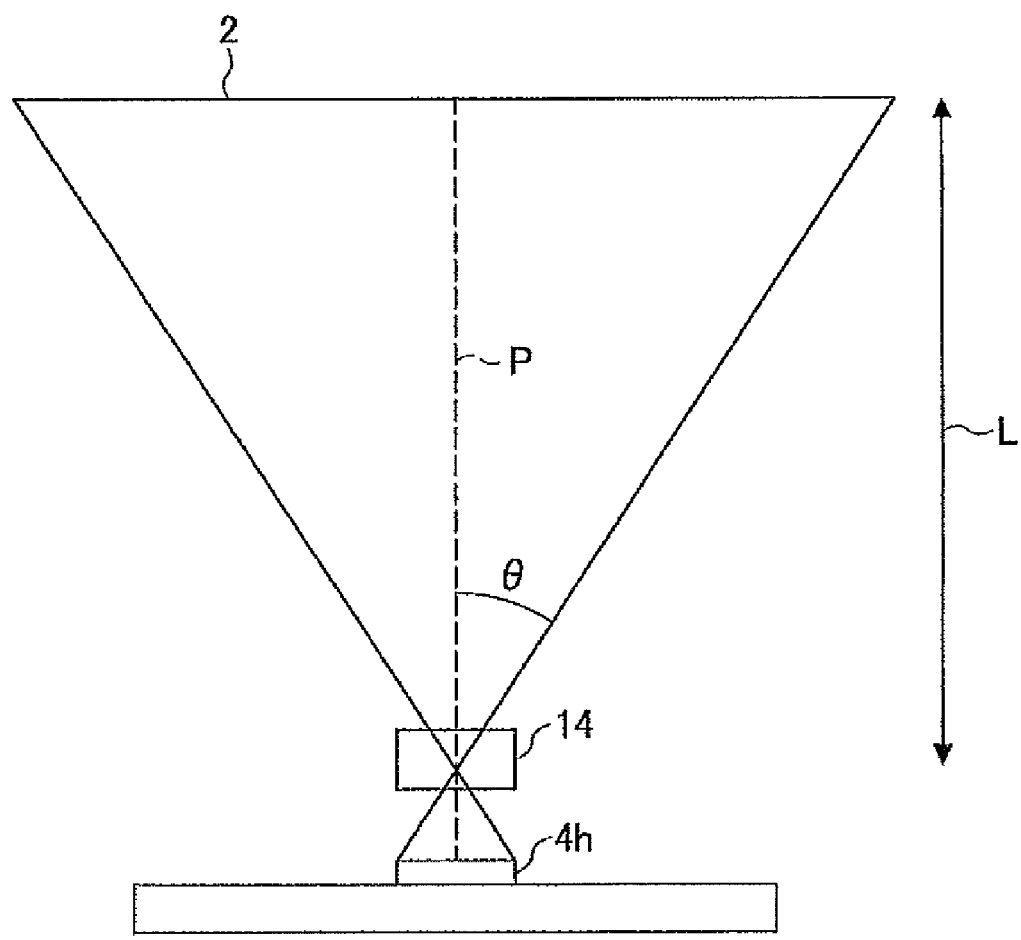
FIG. 3 is a diagram showing the composition of a reduction optical system.
Figure 11A:
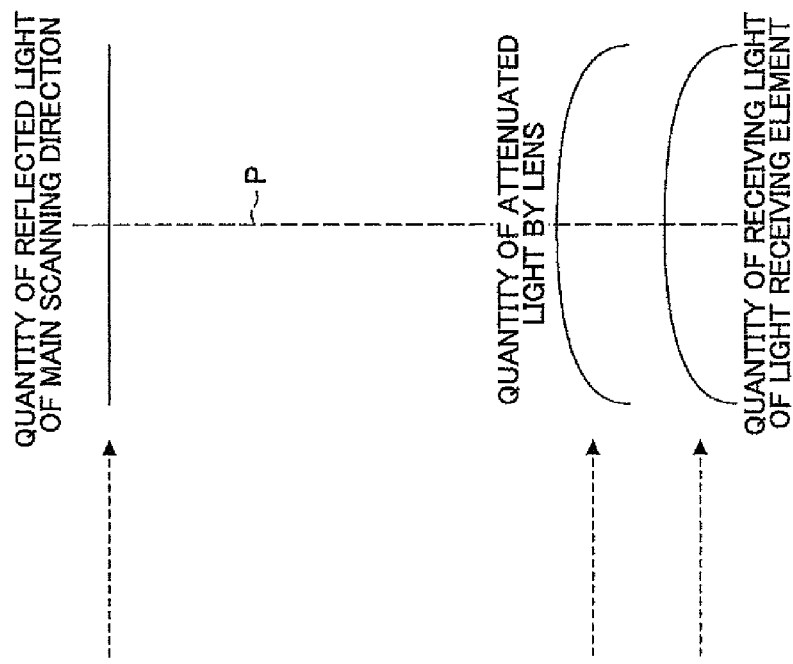
FIG. 11A and FIG. 11B are diagrams for explaining a reduction optical system in the image reading device according to the related art.
Figure 11B:
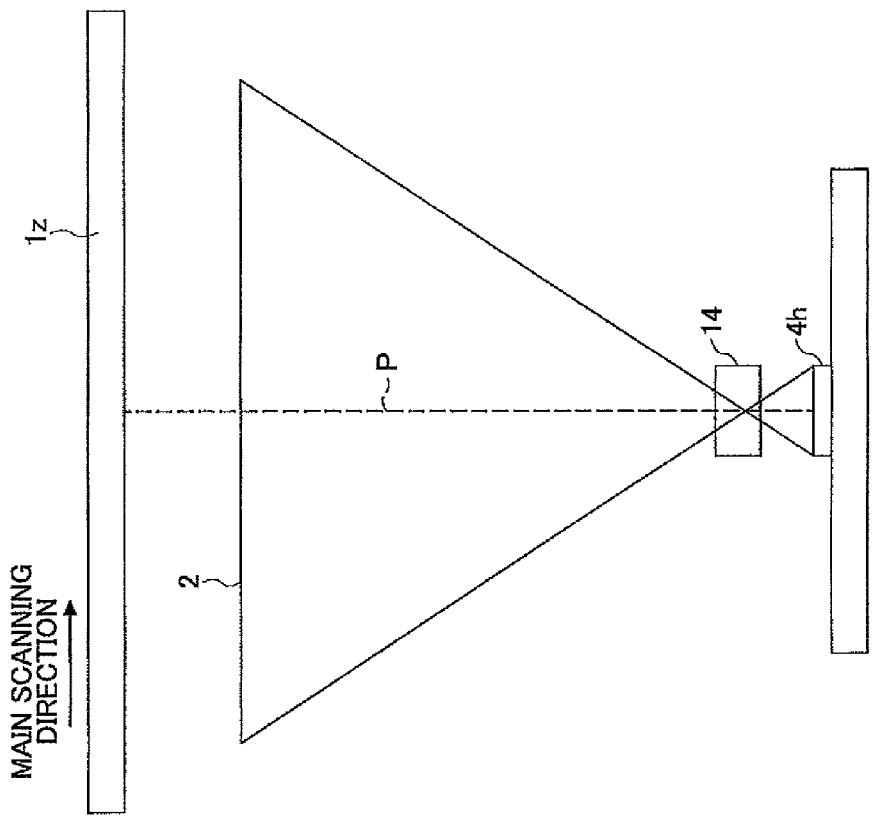

Next, FIG. 3 shows the composition of a reduction optical system in the reading optical system of FIG. 2 when viewed from the side of the sub-scanning direction. For the sake of convenience, the illustration of the reduction optical system in FIG. 3 is modified in the same manner as in FIG. 11A.

In the example shown in FIG. 3, reading of the image information of the whole reading width of a document 2 in the main scanning direction is performed by using a line sensor part 4h provided in the reduction optical system.

Specifically, reflected light beams from the document central portions near the optical axis P of the lens 14 are received by the light quantity sensors in the central portions of the line sensor part 4h, and reflected light beams from the document end portions apart from the optical axis P (each reflected light beam having an angle θ to the optical axis P) are received by the light quantity sensors in the end portions of the line sensor part 4h. For this reason, as described previously, when reading an image from the document in the main scanning direction, the receiving light efficiency of the document end portions is smaller than the receiving light efficiency of the document central portions in accordance with the optical characteristic of the lens 14.

Figure 4:
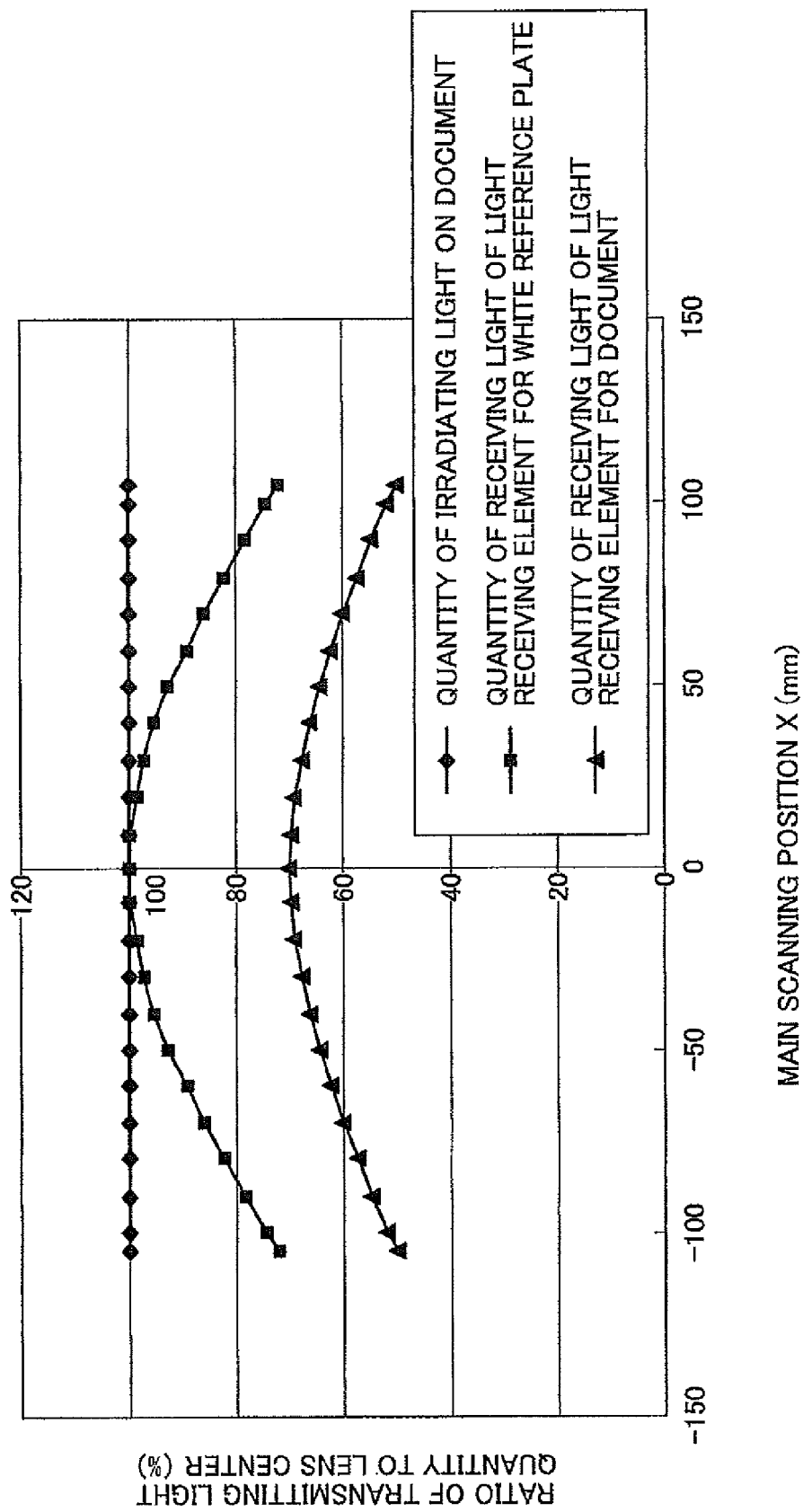
FIG. 4 is a diagram for explaining the optical characteristic of a lens.

FIG. 4 shows the optical characteristic of the lens mentioned above. It is assumed that a white reference plate is optically read and the quantity of irradiating light to a document surface of the white reference plate is 100% for all the main scanning positions on the document surface. A reflected light beam, indicating image information of the document surface of the white reference plate, has passed through the lens and reaches one of the light receiving elements (light quantity sensors) in the line sensor part. As shown in FIG. 4, if the receiving light quantity of the light receiving element at the optical axis position is 100%, the receiving light quantity of another light receiving element apart from the optical axis position decreases from 100% as the distance between the light receiving element and the optical axis position increases. For example, the receiving light quantity of the light receiving element apart from the optical axis position by 100 mm is about 70% in the case of the white reference plate.

Moreover, as shown in FIG. 4, in the case of reading an image from a document actually, the receiving light quantity of the light receiving element apart from the optical axis position by 100 mm is about 50%.

As described above, in the main scanning direction of a document, the receiving light efficiency of the light receiving element apart from the optical axis position with respect to the reflected light beam from the document differs from that of the light receiving element at the optical axis position. If only the change in the receiving light efficiency occurs, the amplitude of the received light signal of the light receiving element may be recovered by amplifying the received light signal of the light receiving element according to the main scanning position of the light receiving element. However, in this case, a noise that may occur until the end of the process of amplifying the received light signal of the light receiving element will be also amplified. That is, it is difficult to improve the S/N (signal/noise) ratio. For this reason, the quality of the image information of the amplified portion at the end of the process remains poor due to the noise.

The image reading device according to the invention does not amplify the received signal information of the light receiving elements. Rather, in order to raise the quantities of the reflected light beams from the end portions of the document apart from the optical axis position (where the transmission characteristic of the lens is inferior), the image reading device according to the invention increases the quantities of the irradiating light beams to the end portions of the document.

In the case of the rod-like lamp light source according to the related art, the irradiating light quantity adjustment is impossible. However, in the case of the line sensor part including the point light sources, such as LEDs, it is possible to carry out the irradiating light quantity adjustment in which only the quantities of irradiating light beams of LEDs irradiating the end portions of the document are increased.

In order to adjust the irradiating light quantity precisely, the process of the adjustment using a white reference plate (which is internally arranged in an image forming device to serve as a reference document) may be performed. In this process, the irradiating light quantities of the point light sources are adjusted so that the receiving light quantities of all the light receiving elements are equal to each other. By performing this process, it is not necessary to use the mechanical shading according to the related art which eliminates the receiving light quantity which is excessively large, and causes the loss of the optical energy.

FIG. 5 shows the composition of a line light source unit 1h using plural point light sources in the image reading device of an embodiment of the invention. In the example of FIG. 5, the point light sources 1a, 1b, 1b', 1c, 1c and 1d may be individual point light sources or may be arrayed into a set of point light source groups.

FIG. 6A and FIG. 6B show the composition of a reduction optical system including the line light source unit 1h shown in FIG. 5.

In the reduction optical system of FIG. 6A, the angle θ of a reflected light beam incoming to the lens 14 increases as the document scanning position moves away from the optical axis position, similar to that shown in FIG. 3.

As shown in FIG. 6B, the irradiating light quantities of the point light sources of the line light source unit 1h are adjusted, so that the irradiating light quantities of the point light sources at the end positions increase as the positions of the point light sources are apart from the optical axis position.

On the contrary, it is shown that the light transmission efficiency of the lens 14 decreases as the angle θ to the lens 14 increases. As a result, the receiving light quantities of the light receiving elements on the line sensor part 4h are equal to each other.

Figure 7:
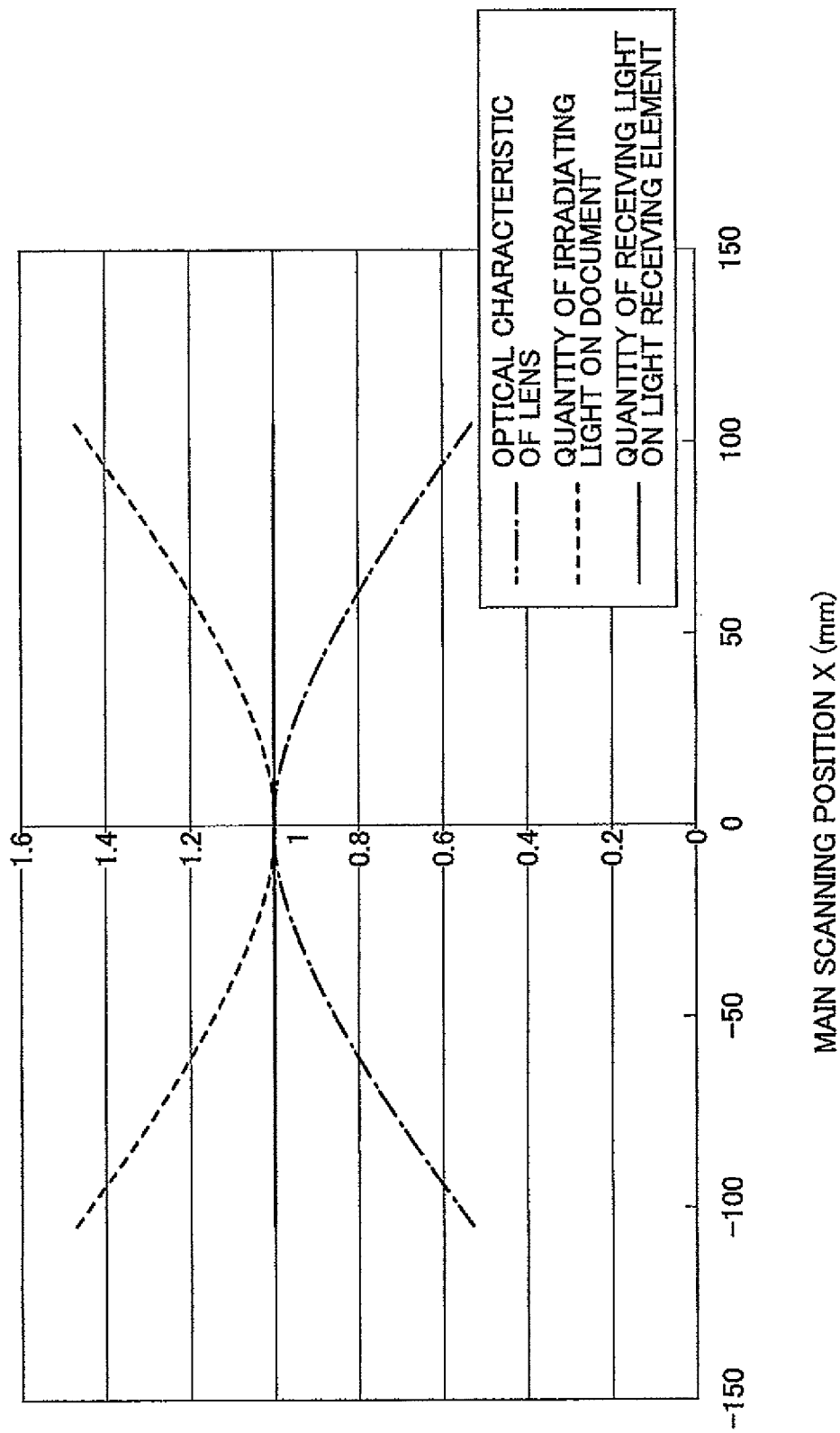
FIG. 7 is a diagram for explaining adjustment of the optical characteristic of a lens in a main scanning direction.

FIG. 7 is a diagram for explaining adjustment of the optical characteristic of the lens in the main scanning direction. The optical characteristic of the lens is illustrated in FIG. 7 as the graph of the one-dot chain line. Each of the quantity of irradiating light on the document and the quantity of receiving light on the light receiving element at the optical axis position is scaled as 1. In order to compensate the lowering of the quantity of transmitting light of the lens in the main scanning direction due to the optical characteristic of the lens, the quantity of irradiating light on the document is increased at end positions apart from the optical axis position, so that the receiving light quantities of the light receiving elements (light quantity sensors) are maintained at a constant level (=1). In this manner, it is possible to use the irradiating light of the light source effectively and equalize the receiving light quantity of the receiving light sensor over the whole light receiving surface.

Next, a method of determining the quantity of irradiating light of each point light source in a reduction optical system will be described.

One method of determining the quantity of irradiating light is to individually compute an irradiating light quantity Ax of each point light source in accordance with the following formula (I):

$$Ax = Ao \times (2 - \cos^4(\tan^{-1}(X/L))) \quad (1)$$

where Ao denotes a quantity of irradiating light of the point light source or the point light source block which irradiates the optical axis position on the document, X denotes a distance from the optical axis position to the reading position on the document, and L denotes a distance of the optical axis from the center of the lens to the surface of the document.

In the above formula (I), $\tan^{-1}(X/L)$ is equivalent to the angle θ in FIG. 6A, and $\cos^4(\tan^{-1}(X/L))$ is a ratio of the quantity of the outgoing light beam to the quantity of the light beam incoming to the lens 14 from the angle θ (=$\tan^{-1}(X/L)$). The value of $\cos^4(\tan^{-1}(X/L))$ is equal to 1 when the angle θ=0 (at the optical axis position), and the value of $\cos^4(\tan(X/L))$ decreases as the value of the angle θ increases. This shows the optical characteristic of a convex lens.

If a distance of the optical path between the lens and the document and a distance between a reading position on the document and the optical axis position in the main scanning direction are determined, an irradiating light quantity of a point light source irradiating a specific position on the document can be computed by using the optical characteristic of the lens.

The image reading device of an embodiment of the invention may be arranged such that the computed irradiating light quantities of the point light sources are respectively set up beforehand. Alternatively, the image reading device of an embodiment of the invention may be arranged such that the distance L of the optical path between the lens center and the document surface is stored beforehand, and the irradiating light quantities of the point light sources are computed and set up in accordance with the reading width of each document in the main scanning direction. Change of the light quantity of a point light source is controllable by the value of the electric current supplied to the point light source.

Another method of determining the quantity of irradiating light of each point light source is to control the irradiating light quantity of each point light source so that the receiving light quantities of the light quantity sensors obtained when a reference document (or a white reference plate) having a uniform reflection factor to the irradiating light is read by using the line sensor are equal to each other, or equal to or larger than a predetermined value. If the receiving light quantities of the light quantity sensors obtained at this time are equal to each other or above the predetermined value, the S/N ratio to a noise with the same level can be above a predetermined level.

The image information obtained from the outputs of all the light quantity sensors can be maintained as being above a predetermined quality level.

If the receiving light quantities of the light quantity sensors obtained after the reference document having a uniform reflection factor to the irradiating light is read are not uniform, the correction may be made by amplifying or decreasing the receiving light signals from the light quantity sensors according to their receiving light ratios, so that the corrected receiving light signals are uniform. It is not necessary that the reference document used is a typical paper document. The reference document used may be a white reference plate which is provided in an image forming device.

Figure 8:
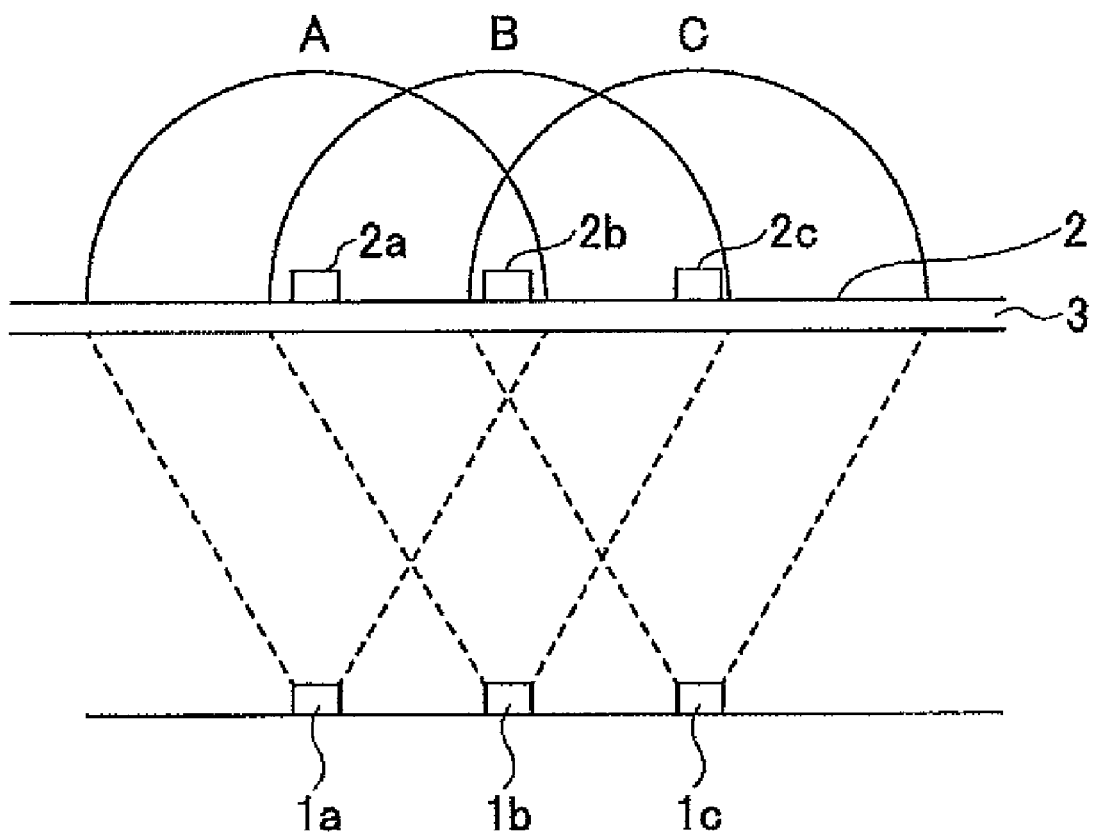
FIG. 8 is a diagram showing the overlapping of irradiating light beams from three point light sources which constitute a line light source part.

Specifically, a method of controlling the quantity of irradiating light of the point light sources using the white reference plate will be described. FIG. 8 shows the overlapping of irradiating light beams from three point light sources constituting a line light source part. If the document 2 is a white reference plate, the irradiating light beams from the point light sources 1a, 1b and 1c are equivalent to the reflected light beams from the document, and the quantities of the reflected light beams overlap each other on the document 2 as indicated by A, B and C in FIG. 8. Each of the point light sources 1a, 1b, and 1c has a directivity.

The method of controlling the quantity of irradiating light of the point light sources is performed as follows. Each time one of the point light sources 1a, 1b and 1c is turned on, the receiving light quantities of the light receiving elements corresponding to the points 2a, 2b and 2c on the document 2 are measured. In this case, it is assumed that the white reference plate having the output level 200/(250) is used as the document 2.

For example, the results of the above measurement are as follows. When the point light source 1a is turned on, the receiving light quantities of the light receiving elements corresponding to the points 2a, 2b, 2c are equal to 120, 30, 0, respectively. When the point light source 1b is turned on, the receiving light quantities of the light receiving elements corresponding to the points 2a, 2b, 2c are equal to 20, 150, 20, respectively. When the point light source 1c is turned on, the receiving light quantities of the light receiving elements corresponding to the points 2a, 2b, 2c are equal to 0, 35, 130, respectively.

Moreover, when all the point light sources 1a, 1b, 1c in the above-described optical system are turned on at a time, the overlapping effect takes place and the receiving light quantities of the light receiving elements corresponding to the points 2a, 2b, 2c are equal to 140, 215, 150, respectively.

Then, the adjustment ratios of the light sources 1a, 1b, 1c to the original light quantities to satisfy the condition that all the receiving light quantities of the light receiving elements corresponding to the points 2a, 2b, 2c are equal to 200 are determined. Namely, the following equations are solved to determine the adjustment ratios X, Y, and Z:

$$120X+20Y=200,$$

$$30X+150Y+35Z=200,$$

$$20Y+130Z=200$$

where X denotes the adjustment ratio of the light source 1a, Y denotes the adjustment ratio of the light source 1b, and Z denotes the adjustment ratio of the light source 1c.

The computations performed to solve the above equations yield the adjustment ratio values: X=1.576, Y=0.540, Z=1.4545. Namely, in this example, the irradiating light quantities of the point light sources 1a, 1b, 1c should be set up according to the ratio of 1.576:0.540:1.4545. In this manner, if the receiving light quantities of the light receiving elements are measured using the white reference plate and the irradiating light quantities of the point light source are computed, the required light source intensities of the point light sources can be set up easily. It is not necessary to compute the value of "$\cos^4(\theta)$". Also in this case, the point light sources may be arrayed into a set of point light source groups, and the computation may be performed for each group.

In the case of a certain LED, the quantity of irradiating light may be proportional to the applied current. However, in the case of another LED, the quantity of irradiating light may not be proportional to the applied current. In the latter case, the image reading device of an embodiment of the invention may be arranged such that the relationship between the applied current and the irradiating light quantity is stored beforehand in the irradiating light quantity control part. In this embodiment, the accurate value of the applied current can be easily computed.

As is apparent from the foregoing description, an image reading device of another embodiment of the invention includes: a light source part in which plural point light sources are arrayed in parallel to a main scanning direction; a line sensor part in which plural light quantity sensors are arrayed in parallel to the main scanning direction; a reduction optical system containing a lens and focusing a reflected light beam indicating image information of a document irradiated by a light beam from the light source part, on the line sensor part to read the image information; and an irradiating light quantity control part configured to control a quantity of irradiating light of each point light source, the irradiating light quantity control part including: a receiving light quantity detection part configured to detect receiving light quantities of the light quantity sensors; a receiving light quantity memory part configured to store receiving light quantities of the light quantity sensors detected by the receiving light quantity detection part when a reference document having a uniform reflection factor to the irradiating light is irradiated by a light beam from a predetermined one of the point light sources and the light quantity sensors receive reflected light beams from the reference document; and an irradiating light quantity computing part configured to compute a quantity of irradiating light of each point light source such that respective receiving light quantities of the light quantity sensors are equal to or larger than a predetermined receiving light quantity based on the receiving light quantities stored by the receiving light quantity memory part. By using the image reading device of this embodiment, it is possible to easily perform the process of irradiating light quantity adjustment of the respective point light sources.

It is preferred that the image reading device of an embodiment of the invention is arranged so that the irradiating light quantity control part includes an irradiating light quantity memory part to store the quantity of irradiating light of each point light source computed by the irradiating light quantity computing part. By storing the computed quantity of irradiating light of each point light source in the irradiating light quantity memory part, the quantity of irradiating light of each point light source can be set up by using the stored value at any time.

It is preferred that the image reading device of an embodiment of the invention is arranged so that the quantity of irradiating light of each point light source is controlled by an electric power applied to the point light source. In the case of a light emitting diode (LED), the quantity of irradiating light is easily controlled by the electric power applied to the LED. Thus, the LED may be considered an appropriate point light source for the image reading device of the invention.

In addition, a light emitting diode (LED) has a directivity and generates little heat. The plural LEDs (point light sources) in the light source part may be easily arrayed into a set of LED groups (point light source groups).

It is preferred that the image reading device of an embodiment of the invention is arranged to include a point light source judging part which determines that a quantity of receiving light of one of the light quantity sensors when a reference document (for example, a white reference plate) having a uniform reflection factor to the irradiating light is irradiated by an irradiating light beam with a maximum light quantity from one of the point light sources and the one of the light quantity sensors receives a reflected light beam from the reference document is equal to or larger than a predetermined value.

When the receiving light quantity of the light quantity sensor corresponding to the maximum-quantity irradiating light beam is not above the predetermined value, the irradiation capability of the point light source of concern is reduced or its irradiation capability is lost. This allows the user to recognize that it is necessary to exchange the point light source of concern with new one. By using the above-mentioned point light source judging part, it is easy to discover a defect of any of the point light sources in the light source part.

The image reading device of an embodiment of the invention may be arranged so that the document is irradiated by irradiating light beams of white (the color containing all the wavelengths) from the point light sources, Alternatively, the image reading device of an embodiment of the invention may be arranged so that the light quantity sensors receive reflected light beams from the document repeatedly each time the document is irradiated by irradiating light beams of one of plural colors (or the light beams with plural wavelengths) from the point light sources of the light source part, and the quantity of irradiating light of each point light source is controlled for each of the colors. For example, the image reading device of this embodiment may be provided with three reduction optical systems of three colors of Y, C and M and three line sensor parts of three colors of Y, C and M.

It is preferred that the image reading device of an embodiment of the invention is arranged so that an index value indicating a quantity of irradiating light of each point light source is displayed on a display device (not shown). According to this embodiment, the user can recognize the quantities of irradiating light of the point light sources which are currently set up, and can check the situations of the current loads of the point light sources.

Figure 9A:
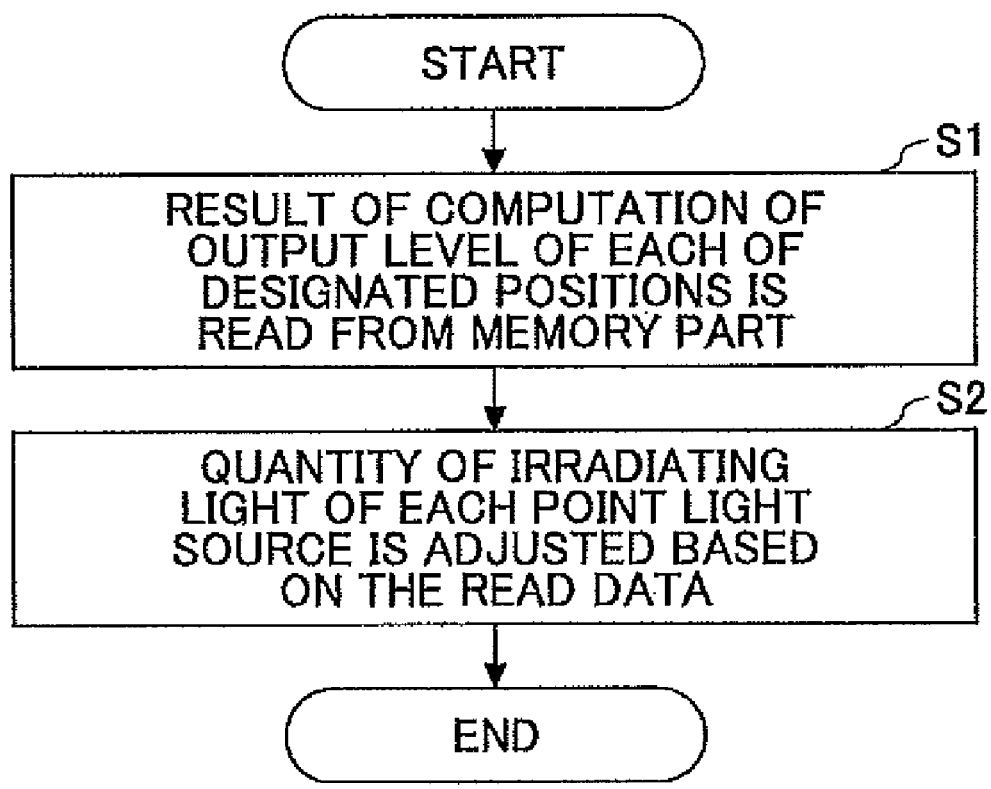
Figure 10:
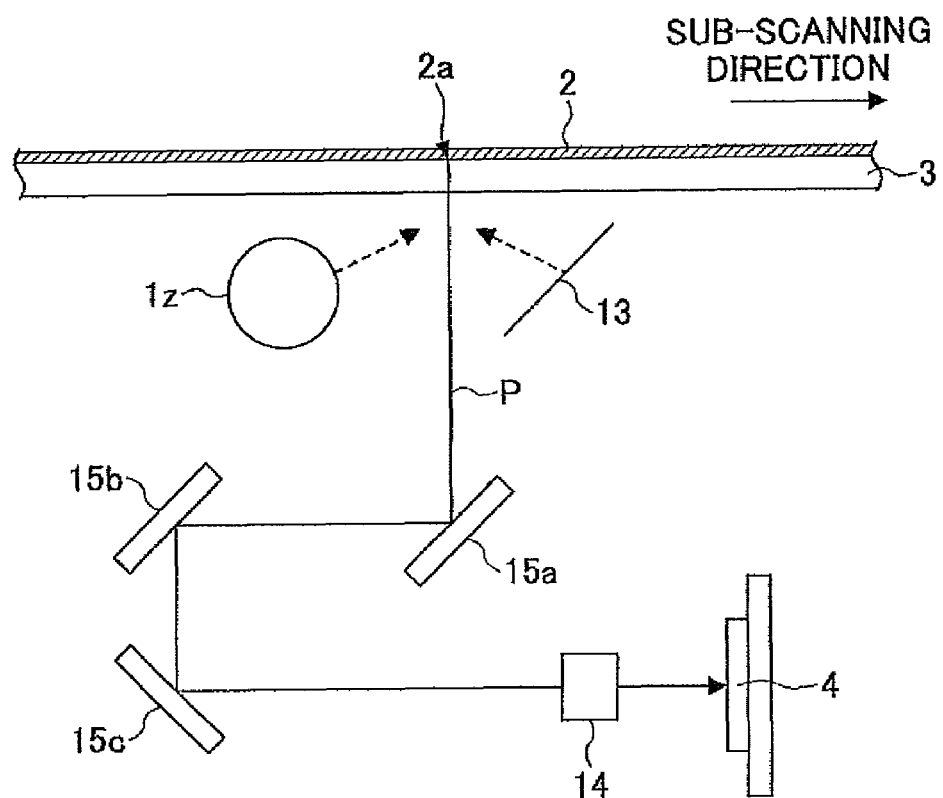
FIG. 10 is a diagram showing the composition of a reading optical system of an image reading device according to the related art.

Next, FIG. 9A and FIG. 9B are flowcharts for explaining the process of irradiating light quantity adjustment of the LED light sources.

In the flowchart of FIG. 9A, it is assumed that the image reading device is provided with the irradiating light quantity control part described above, and the output level (the irradiating light quantity) of each of designated positions of the respective point light sources is already stored in the irradiating light quantity memory part of the irradiating light quantity control part.

Upon starting of the process of irradiating light quantity adjustment of FIG. 9A, the irradiating light quantity control part reads the output level of each of designated positions of the point light sources from the irradiating light quantity memory part (S1). The irradiating light quantity control part adjusts the quantity of irradiating light of each point light source to the read output level of the designated position of the corresponding one of the point light sources (S2). After the step S2 is performed, the image information of the document is read by the image reading device.

Next, the process of irradiating light quantity adjustment of the LED light sources shown in FIG. 9B will be described.

In the flowchart of FIG. 9B, it is assumed that, before adjustment, a white reference plate is set in the image reading device as a document. Then, the process of irradiating light quantity adjustment of FIG. 9B is started.

Upon starting of the process of FIG. 9B, the irradiating light quantity control part computes the current value of one of the LEDs based on the position information of the point light sources to the white reference plate (S11). Next, the irradiating light quantity control part turns on each of the LEDs (point light sources) (S12).

After the LEDs (point light sources) are turned on, the irradiating light quantity control part detects the output level of each of the designated positions of the point light sources by using the line sensor part (S13). The irradiating light quantity control part determines whether the detected output level of each of the designated positions falls within a predetermined range (S14).

When the output level of each of the designated positions falls within the predetermined range in the step S14, the quantity of irradiating light of each of the designated positions is normal, the process of irradiating light quantity adjustment is terminated.

When the output level of each of the designated positions does not fall within the predetermined range in the step S14, the turning-on test is performed in which an arbitrary one of the LEDs of the designated positions is turned on and the other LEDs are turned off (S15) The receiving light level of a corresponding one of the light quantity sensors (light receiving elements) for the turned-on LED is detected and stored (S16).

The irradiating light quantity control part determines whether the detected receiving light level of the corresponding light quantity sensor is larger than a reference value (S17).

When the detected receiving light level of the corresponding light quantity sensor is not larger than the reference value in the step S17, the turned-on LED is determined as being defective (S22).

When the result of the determination in the step S17 is affirmative, the irradiating light quantity control part determines whether the turning-on test is performed for all the LEDs (S18). When the result of the determination in the step S18 is negative, the LED is replaced by the next LED (321), and the control is returned to the step S15 so that the turning-on test is continuously performed until all the LEDs are tested.

When the result of the determination in the step S18 is affirmative, the irradiating light quantity control part computes the current value of each of the LEDs based on the detected receiving light levels of the light quantity sensors which are larger than the reference value, and stores the results of the computation (S19). The irradiating light quantity control part changes the current value of each of the LEDs to the computed current value (S20). Then, the process of irradiating light quantity adjustment is terminated.

An image forming device of an embodiment of the invention is provided with the above-described image reading device. The image forming device forms an image based on the image information generated by the image reading device. The image forming device according to the invention may be an image forming device of any type, including an electrophotographic type image forming device, an ink jet type image forming device, and so on. The image forming device according to the invention may be a multi-functional peripheral having multiple image forming functions, including a printing function, a facsimile function, an image projection function, a voice transmitting/receiving function, and so on.

The present invention is not limited to the specifically disclosed embodiments, and variations and modifications may be made without departing from the scope of the present invention.

The present application is based on Japanese patent application No. 2008-033453, filed on Feb. 14, 2008, and Japanese patent application No. 2008-318867, filed on Dec. 15, 2008, the contents of which are incorporated herein by reference in their entirety.

What is claimed is:

1. An image reading device which reads an image from a document, comprising:
    a light source part in which plural point light sources are arrayed in parallel to a main scanning direction;
    a line sensor part in which plural light quantity sensors are arrayed in parallel to the main scanning direction;
    a reduction optical system containing a lens and focusing a reflected light beam, indicating image information of a document irradiated by a light beam from the light source part, on the line sensor part to read the image information; and
    a control part configured to control a quantity of irradiating light of each point light source of the light source part in accordance with an optical characteristic of the lens of the reduction optical system,
    wherein the plural point light sources in the light source part are arrayed into a set of point light source blocks, and
    the image reading device comprises an irradiating light quantity control part configured to control a quantity of irradiating light of each point light source or each point light source block which irradiates one of reading positions on the document, based on a quantity of irradiating light of a point light source or a point light source block which irradiates an optical axis position of the reduction optical system, a distance between the optical axis position and a corresponding one of the reading positions, and a distance of an optical path between a center of the lens and a surface of the document.

2. The image reading device according to claim 1, wherein the optical characteristic of the lens of the reduction optical system is represented by a quantity of attenuated light in the reduction optical system with respect to a reflected light beam from each of respective positions on the document in the main scanning direction.

3. The image reading device according to claim 1, wherein the plural point light sources in the light source part are arrayed into a set of point light source blocks, and the control part controls a quantity of irradiating light of each point light source block.

4. The image reading device according to claim 1, wherein each of the point light sources has a directivity.

5. The image reading device according to claim 1, wherein the irradiating light quantity control part determines a quantity $Ax$ of irradiating light of a point light source or a point light source block which irradiates a reading position on the document apart from an optical axis position of the reduction optical system in accordance with the formula:

$$Ax = Ao \times (2 - \cos^4(\tan^{-1}(X/L)))$$

where $Ao$ denotes a quantity of irradiating light of the point light source or the point light source block which irradiates the optical axis position on the document, $X$ denotes a distance from the optical axis position to the reading position on the document, and $L$ denotes a distance of an optical axis from a center of the lens to a surface of the document.

6. The image reading device according to claim 1, wherein the quantity of irradiating light of each point light source or each point light source block is controlled such that quantities of receiving light of the light quantity sensors when the light quantity sensors receive reflected light beams from a reference document having a uniform reflection factor to the irradiating light are equal to each other.

7. The image reading device according to claim 1 wherein the quantity of irradiating light of each point light source or each point light source block is controlled such that quantities of receiving light of all the light quantity sensors when the light quantity sensors receive reflected light beams from a reference document having a uniform reflection factor to the irradiating light are equal to or larger than a predetermined value.

8. An image forming device in which the image reading device of claim 1 is arranged, wherein the image forming device forms an image based on the image information generated by the image reading device.

9. An image reading device comprising:
    a light source part in which plural point light sources are arrayed in parallel to a main scanning direction;
    a line sensor part in which plural light quantity sensors are arrayed in parallel to the main scanning direction;
    a reduction optical system containing a lens and focusing a reflected light beam indicating image information of a document irradiated by a light beam from the light source part, on the line sensor part to read the image information; and
    an irradiating light quantity control part configured to control a quantity of irradiating light of each point light source, the irradiating light quantity control part comprising:
    a receiving light quantity detection part configured to detect receiving light quantities of the light quantity sensors;
    a receiving light quantity memory part configured to store receiving light quantities of the light quantity sensors detected by the receiving light quantity detection part when a reference document having a uniform reflection factor to the irradiating light is irradiated by a light beam from a predetermined one of the point light sources and the light quantity sensors receive reflected light beams from the reference document; and
    an irradiating light quantity computing part configured to compute a quantity of irradiating light of each point light source such that respective receiving light quantities of the light quantity sensors are equal to or larger than a predetermined receiving light quantity based on the receiving light quantities stored by the receiving light quantity memory part,
    wherein the image forming further includes a display device configured to display an index value indicating the quantity of irradiating light of each point light source.

10. The image reading device according to claim 9, wherein the irradiating light quantity control part includes an irradiating light quantity memory part configured to store the quantity of irradiating light of each point light source computed by the irradiating light quantity computing part.

11. The image reading device according to claim 9, wherein the quantity of irradiating light of each point light source is controlled by an electric power applied to the point light source.

12. The image reading device according to claim 9, further comprising a point light source judging part configured to determine that a quantity of receiving light of one of the light quantity sensors when a reference document having a uniform reflection factor to the irradiating light is irradiated by an irradiating light beam with a maximum light quantity from one of the point light sources and said one of the light quantity sensors receives a reflected light beam from the reference document is equal to or larger than a predetermined value.

13. The image reading device according to claim 9, wherein the light quantity sensors receive reflected light beams from the document repeatedly each time the document is irradiated by irradiating light beams of one of plural colors from the point light sources of the light source part, and the irradiating light quantity control part controls the quantity of irradiating light of each point light source for each of the colors.

14. An image reading method for use in an image reading device including a light source part in which plural point light sources are arrayed in parallel to a main scanning direction, a line sensor part in which plural light quantity sensors are arrayed in parallel to the main scanning direction, and a reduction optical system containing a lens, the image reading method comprising the steps of:

focusing a reflected light beam, indicating image information of a document irradiated by a light beam from the light source part, on the line sensor part by using the reduction optical system to read the image information; and controlling a quantity of irradiating light of each point light source of the light source part in accordance with an optical characteristic of the lens of the reduction optical system, wherein the point light sources in the light source part are arrayed into a set of point light source blocks, the image reading method further includes the step of:

controlling a quantity of irradiating light of each point light source or each point light source block which irradiates one of reading positions on the document, based on a quantity of irradiating light of a point light source or a point light source block which irradiates an optical axis position of the reduction optical system, a distance between the optical axis position and a corresponding one of the reading positions, and a distance of an optical path between a center of the lens and a surface of the document.

* * * * *